US007869071B2

(12) United States Patent
Liu

(10) Patent No.: US 7,869,071 B2
(45) Date of Patent: Jan. 11, 2011

(54) PRINTER WITH SECURITY ALGORITHM

(75) Inventor: Rong Liu, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1946 days.

(21) Appl. No.: 10/891,167

(22) Filed: Jul. 13, 2004

(65) Prior Publication Data

US 2006/0012805 A1 Jan. 19, 2006

(51) Int. Cl.
*G06F 15/00* (2006.01)
*G06F 15/173* (2006.01)

(52) U.S. Cl. ..................................... 358/1.15; 709/223

(58) Field of Classification Search ................ 358/1.15, 358/1.13, 1.14, 1.16, 402, 1.2, 450, 451, 358/440; 709/223, 224, 229, 217, 202, 225, 709/206; 235/487, 382; 713/193, 179
See application file for complete search history.

(56) References Cited

U.S. PATENT DOCUMENTS

| 5,802,260 A | 9/1998 | Shimakawa et al. |
| 5,970,228 A | 10/1999 | Nezu |
| 6,170,007 B1 | 1/2001 | Venkatraman et al. |
| 2001/0000360 A1 | 4/2001 | Shibata |
| 2002/0051167 A1 | 5/2002 | Francis et al. |
| 2002/0133636 A1 | 9/2002 | Venkatraman et al. |
| 2003/0033192 A1* | 2/2003 | Zyman et al. ................. 705/10 |
| 2003/0041269 A1 | 2/2003 | Kurishita et al. |
| 2003/0107756 A1 | 6/2003 | Dan et al. |
| 2003/0167336 A1* | 9/2003 | Iwamoto et al. ............. 709/229 |
| 2003/0179404 A1 | 9/2003 | Matsueda |
| 2003/0182587 A1 | 9/2003 | Morrison et al. |
| 2003/0184805 A1 | 10/2003 | Kurokawa et al. |
| 2004/0003347 A1 | 1/2004 | Saidenberg et al. |
| 2004/0034582 A1 | 2/2004 | Gilliam et al. |
| 2004/0125402 A1* | 7/2004 | Kanai et al. ................. 358/1.15 |

FOREIGN PATENT DOCUMENTS

JP      2002-007094     1/2002

* cited by examiner

*Primary Examiner*—Saeid Ebrahimi Dehkordy

(57) ABSTRACT

A printer has a security algorithm configured to determine a source of an incoming print job and accept or reject the print job based on the source of the print job.

46 Claims, 4 Drawing Sheets

PRINTER WITH SECURITY ALGORITHM

BACKGROUND

With a personal computer and an appropriate software package, a user can produce virtually any type of document that may be desired. For example, word processing software is used to produce text documents. Graphic design or computer-aided design software can be used to produce diagrams, charts, graphs, etc. Spreadsheet software allows a user to manage large amounts of financial and other types of information. Database software similarly allows a user to manage various databases of information such as, client contact information, address and phone number information or "to do" items.

Frequently, it is desirable to generate a hardcopy of a document or data set that is produced or stored on a personal computer. A hardcopy may be desired, for example, for record keeping purposes or to share with another party. Consequently, a wide variety of printers and printing devices have been developed that can receive a print job from a host computer and produce a hardcopy of the document or data represented by that print job To make the most efficient use of resources, a printer or printing device is often connected to a network so that many different users who are also connected to that network can send a print job to that printer. Such a network may also be connected to a larger network, such as a Wide Area Network (WAN) or intranet, allowing even more users potential access to the printer. Such networks are also frequently connected to the Internet. If the printer is ultimately connected to the Internet, anyone with access to the Internet can potentially send a print job to that printer. Typically, a networked printer is given an Internet Protocol (IP) address. If the printer is not protected by a firewall or the firewall is broken, anyone who learns this address can then direct a print job over the Internet to the printer.

Unfortunately, this situation may be abused. Someone without authorization may maliciously direct a large volume of print jobs or an inappropriate print job to such a networked printer. This may waste significant resources of the printer owner or operator, or may expose the printer's users to offensive material.

One solution to this situation has been to require entry of a user identification and password before allowing access to a printer. However, this is obviously cumbersome for legitimate users of the printer. In some cases, this also requires a relatively large storage capacity inside the printer to store all the authorized user names and passwords.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

When security is desired for a printer, an authorized user can access the printer's controls and set a desired security level. Then, when receiving a print job, the printer will determine from where the print job has been sent and accept or reject the print job based on its source or origin and the security level to which the printer has been set.

For example, at one level, the printer will accept any print job received. At another level, the printer will accept only print jobs sent from the same wide area network (WAN) or intranet as that to which the printer is connected. At another level, the printer will accept only print jobs from the same local area network (LAN) as that to which the printer is itself connected. At a most restricted level, the printer will accept only those print jobs sent from a group of designated clients. The least restricted level may be set as the default security level.

As used herein and in the appended claims, the terms "printer" and "printing device" are defined to mean any device that produces a hardcopy from electronic data, including, but not limited to, laser printers, inkjet printers, dot matrix printers, plotters, facsimile machines, digital copiers, photocopiers, multi-function peripherals, and the like. A printer or printing device may produce images on a variety of print media that are in color or are monochromatic. The term "print job" is defined as data that has been specifically formatted for submission to a particular printer from which the printer can generate a hardcopy representing an underlying data set from which the print job was created. A "client" is a computer, server or other machine that submits a print job to a printer.

Figure 1:
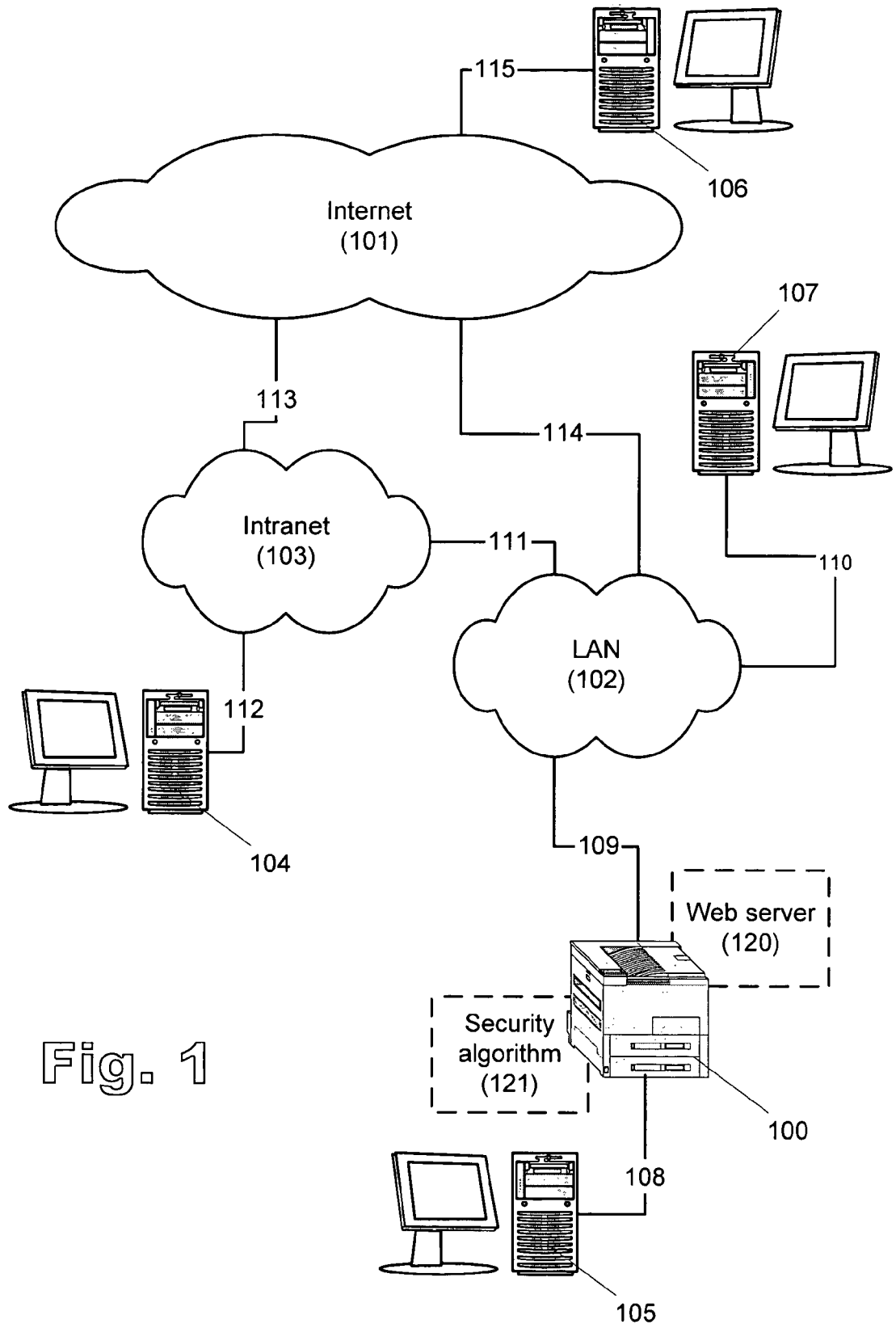
FIG. 1 is a network diagram illustrating one embodiment of the printer security system disclosed herein.

By way of example, FIG. 1 is a network diagram illustrating one embodiment of the printer security system disclosed herein. As shown in FIG. 1, a printer (100) is connected to a network or LAN (102). Consequently, because the printer is connected (109) to a network, print jobs can be sent to the printer (100) from a number of different clients, e.g., computers or servers, that are also connected, directly or indirectly, to the printer's network (102).

For example, one computer (107) is also connected, via a connection (110), to the LAN (102) to which the printer (100) is also connected. Consequently, the computer (107) can submit a print job over the LAN (102) to the printer (100).

The LAN (102) may also be part of, or connected to, a larger network such as a wide area network (WAN) or intranet (103). This connection (111) allows other computers that are connected to the intranet (103) to have access to the LAN (102) and, ultimately, to the printer (100). Consequently, a computer (104) connected (112) to the intranet (103) may submit a print job over the intranet (103) and LAN (102) to the printer (100).

The intranet (103) may be connected (113) to the Internet (101) or other global network. Alternatively, the LAN (102) may be directly connected (114) to the Internet (101). Where either situation is the case, a computer (106) that is connected (115) to the Internet (101) can then potentially submit a print job to the printer (100). For example, the computer (106) can submit a print job to the printer (100) through the internet (101), intranet (103) and LAN (102) or through the Internet (101) and LAN (102).

In some embodiments, the printer (100) may be connected directly to the Internet (101) or to a wide area network or intranet (103). As long as some link exists between a computer and the printer (100), that computer can potentially be used to submit a print job to the printer (100).

The printer (100) may also be directly connected to one or more host computers (105). This connection (108) may be, for example, a serial or parallel connection and allows the connected host computer (105) to submit print jobs directly to the printer (100). In some embodiments, other computers may submit print jobs or access the printer (100) through the connected computer (105).

As disclosed herein, to prevent abuse of the printer (100), the printer (100) includes a security algorithm (121). When receiving a print job, the security algorithm (121) will determine from where the print job has been sent and accept or reject the print job based on its source and the security level to which the printer (100) has been set.

For example, if the security level is set at the Internet level, the printer (100) will accept any print job received. If security is set at the WAN or intranet level, the printer (100) will only accept print jobs sent from the same wide area network (WAN) or intranet (103) as that to which the printer is connected, e.g., computer (104) or computer (107) in FIG. 1. At the LAN security level, the printer (100) will accept only print jobs from the same LAN as that to which the printer (100) is itself connected, e.g., computer (107) in FIG. 1. At a most restricted or machine level, the printer (100) will accept only those print jobs sent from a group of designated clients.

The security algorithm (121) may be accessed, and a security level set within the algorithm, in several different ways, For example, an authorized administrator may access the security algorithm and set a desired security level using a user interface that is directly on the printer (100). Such a user interface would typically include a display (not shown), such as a liquid crystal display (LCD) and a number of buttons or a keypad or other user input devices.

In some embodiments, the printer (100) includes a web server (120) that will serve up a web page to a requesting web browser (not shown). The requesting web browser may be on a computer that is directly or indirectly connected to the printer (100). The link between the computer running the requesting web browser and the printer (100) may be via the Internet, a WAN, a LAN, directly or any or all of the these The web page offered by the web server (120) includes controls for the printer (100), including the security algorithm (121), and the ability to specify a desired security level. In this way, the security algorithm (121) can be controlled and the security level set from any computer having a web browser and a connection, direct or indirect, to the printer (100) with the web server (120).

For security, it will be desirable for only an authorized administrator to control the security algorithm (121) and set the desired level of security. Consequently, the security algorithm may required an identification and/or password before accepting a new security level setting or other changes to the operation of the security algorithm. In this way, only the authorized administrator needs to input credentials to adjust the security of the printer (100). It is not required that each user enter an identification and/or password for each print job.

Figure 2:
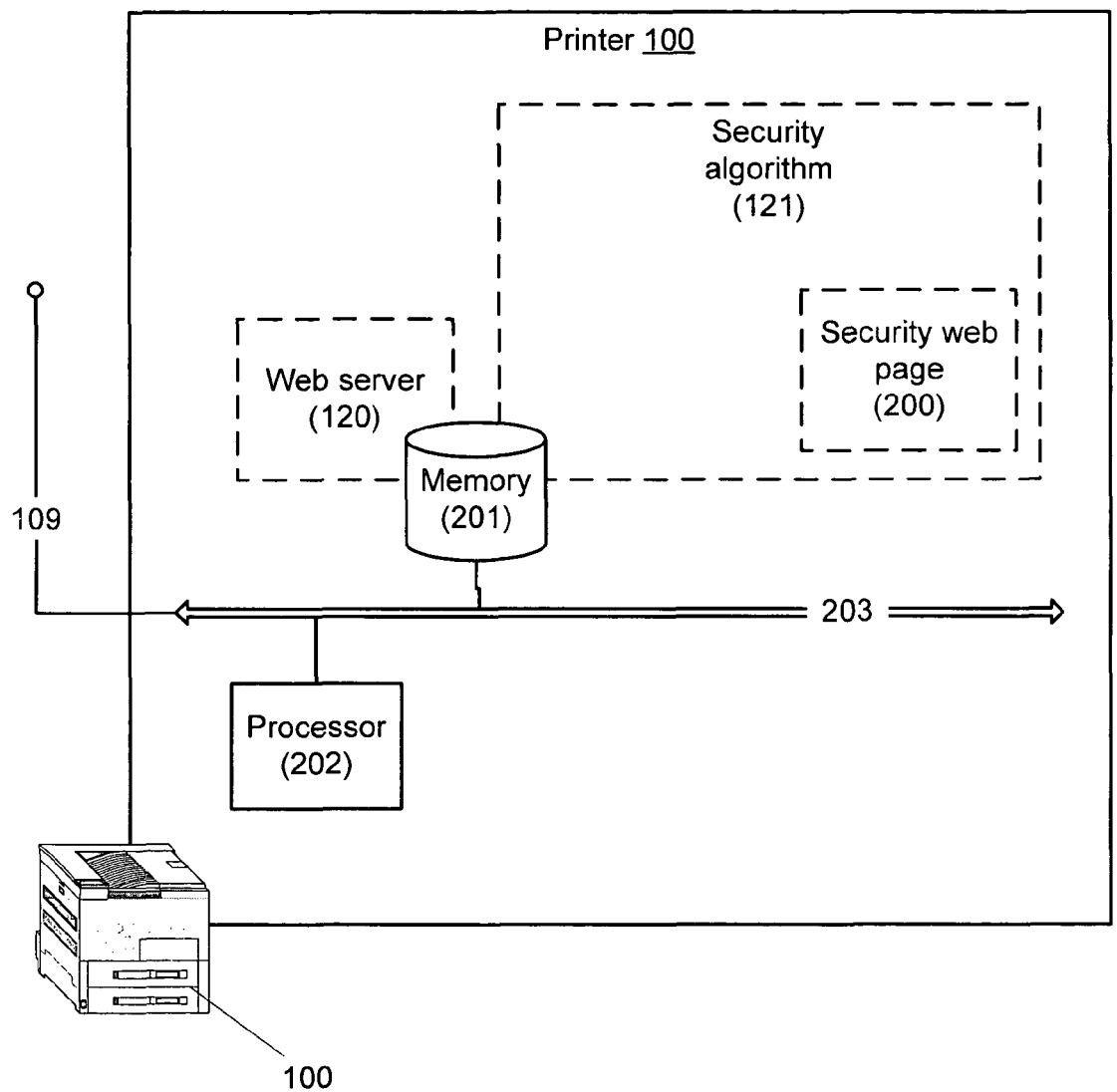
FIG. 2 is a block diagram of a printer incorporating one embodiment of the printer security system disclosed herein.

FIG. 2 is a block diagram of a printer incorporating one embodiment of the printer security system disclosed herein. As shown in FIG. 2, the printer (100) includes a processor (202) and a memory (201). The memory (201) is a medium for storing machine-readable instructions and data. The processor (202) executes firmware stored in the memory (201) to control operation of the printer (100). The memory (201) may be, for example, a hard drive or Flash memory.

The processor (202) and memory (201) are both connected to a data bus (203). The data bus (203) provides communication between the processor (202) and the memory (201) and among other components of the printer (100). The bus (203) may also provide a connection between the processor (202) and the external connection (109) of the printer (100) through which print jobs and other data are received.

Also stored in the memory (201) is the web server (120). The web server (120) is executed by the processor (202) and responds to requests received over the external connection (109) for access to the web page or web pages of the printer (100), particularly the security web page (200) for controlling the security algorithm (121) of the printer (100). As indicated above, the web server (120) may require an identification and or password before serving up a web page to a requesting user so that only authorized administrators can access the web page or web pages of the printer (100).

The memory (201) also stores the security algorithm (121), described above. This algorithm (121) is executed by the processor (202) to determine which print jobs to accept and which to reject to provide a desired level of security for the printer (100).

For example, if the security level is set at the Internet level, the algorithm (121) will accept any print job received. If the security level is set at the WAN or intranet level, the algorithm (121) will accept only print jobs sent from the same wide area network (WAN) or intranet as that to which the printer (100) is connected. At the LAN security level, the algorithm (121) will accept only print jobs from the same LAN as that to which the printer (100) is connected. At a most restricted or machine level, the algorithm (121) will store a list of authorized users or designated computers that have been identified as having authorization to submit print jobs to the printer (100). The algorithm (121) will then accept only those print jobs sent from the group of designated clients.

If the algorithm (121) accepts a print job, that print job is executed and a hardcopy product is produced by the printer (100). If the print job is refused, the algorithm (121) may signal to the client that the print job has been refused or may simply purge the print job from memory with or without notifying the submitting client that the job was refused.

The security algorithm (121) may also include the security web page (200). This security web page (200) is essentially an interface with the security algorithm (121). The security web page (200) may be offered by the web server (120) to a requesting browser as a complete web page or as part of a larger web page of controls for the printer (100).

From the security web page (200), the security level of the algorithm (121) can be set. As indicated, security may be set to one of a variety of levels, for example, the Internet level, intranet level, LAN level or machine level. These options may appear in, for example, a pull-down menu or list of radio buttons on the security web page (200). Any method or means for displaying the various security level options and allowing a user to select among them may be used.

Once the authorized administrator has indicated the desired security level using a browser and the security web page (200), the selected security level is returned to the printer (100) by the browser and implemented by the security algorithm (121). As indicated, access to the security web page may be controlled using a password or other credentials that a requesting user must provide.

Figure 3:
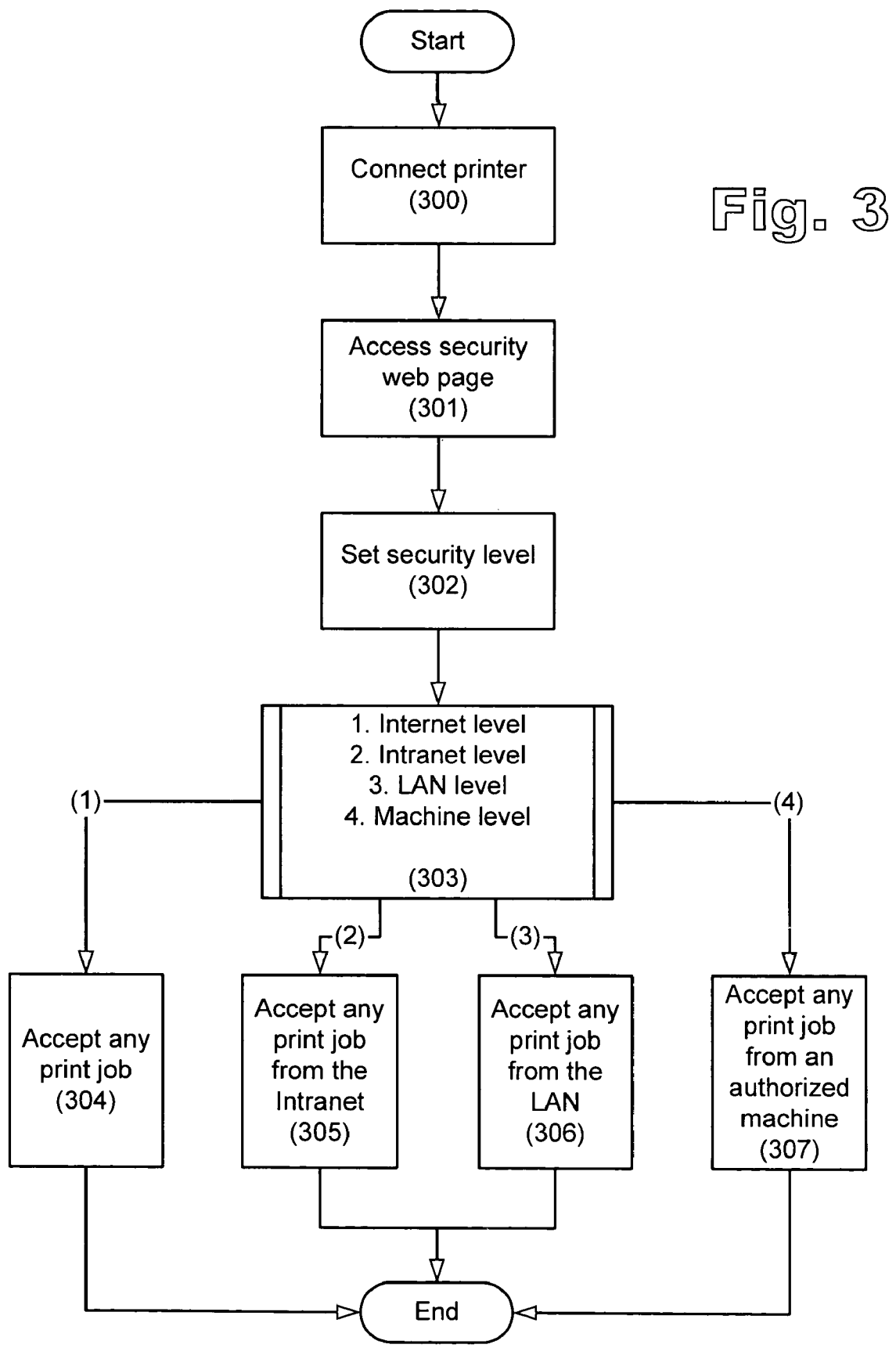
FIG. 3 is a flowchart illustrating the implementation of one embodiment of the printer security system disclosed herein.

FIG. 3 is a flowchart illustrating the implementation of one embodiment of the printer security system disclosed herein. After a printer is installed or connected (step 300), it may be desirable to specify a security setting for that printer to prevent authorized use or abuse. Different levels of security will be desired in different settings.

An authorized administrator then accesses the security settings for the printer. This may be done, for example, by operating the user interface physically on the printer or by browsing a security web page (step 301) that is served by an embedded web server in the printer. Access to the security web page may be controlled with a password or other credentials.

Next, the administrator sets the desired security level for the printer (step 302). In the embodiment shown in FIG. 3, there are four different levels of security that may be selected, Internet level, intranet level, LAN level and machine level (box 303).

If security is set at the Internet level, the printer will accept any print job received (step 304). If security is set at the WAN or intranet level, the printer will accept only print jobs sent from the same WAN or intranet as that to which the printer is connected (step 305). At the LAN level, the printer will accept only print jobs from the same LAN as that to which the printer is connected (step 306).

At a most restricted or machine level, the printer will store a list of clients, i.e., authorized users or designated computers, that have been identified as having authorization to submit print jobs to the printer. Then, only print jobs from those authorized clients will be accepted (step 307). If this level of security is chosen, the security web page or other controls for the security algorithm will allow or prompt the administrator to identify the group of clients from which print jobs are to be accepted. This may be done by specifying the IP address of each of the authorized clients.

Figure 4:
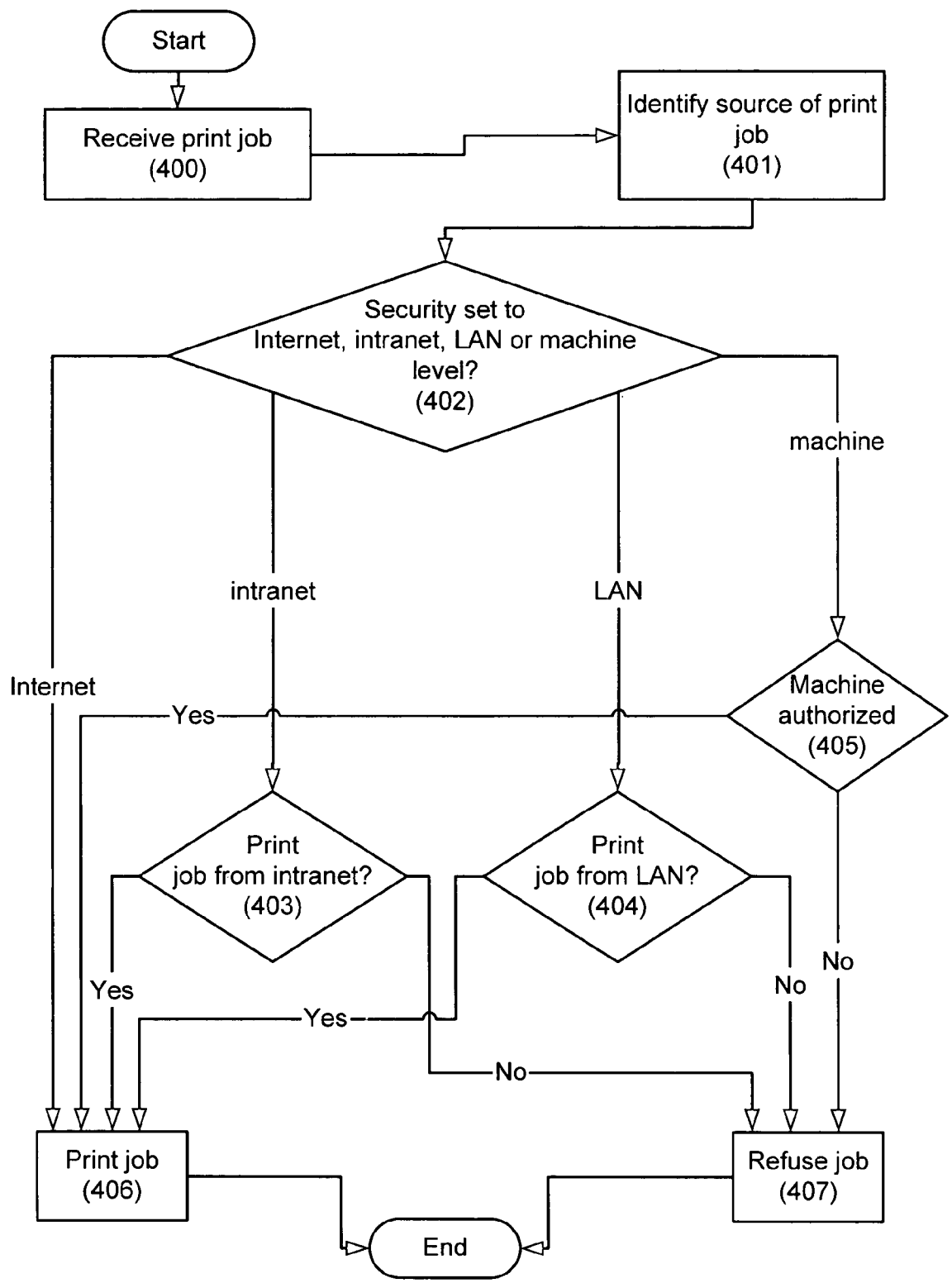
FIG. 4 is a flowchart illustrating the operation of one embodiment of the printer security system disclosed herein.

FIG. 4 is a flowchart illustrating the operation of one embodiment of the printer security system disclosed herein. As described above, and as illustrated in FIG. 4, the security algorithm (121) functions, as follows. The flowchart of FIG. 4 may be considered as a complete representation of one embodiment of the security algorithm from which one of skill in the art could produce the desired algorithm.

As shown in FIG. 4, the security algorithm is invoked when a print job is received (step 400). First, the algorithm will determine the source of the print job (step 401). For example, the algorithm determines whether the print job originated on the same WAN, intranet or LAN to which the printer is itself connected. The algorithm may also determine if the print job was submitted by a particular client, e.g., a computer or server, which is listed as an authorized client for submitting print jobs to the printer.

Next, the security algorithm checks the security level setting that has been made by an authorized administrator (determination 402). For example, the security setting may be one of four security levels, (1) Internet, (2) intranet or WAN, (3) LAN or (4) machine.

If the security level setting is set to the lowest or "Internet" security level, the printer will accept any print job (step 406). If the security level is set to the next level, or intranet level, the security algorithm will print the job only if the job originated on the intranet or WAN to which the printer is itself connected (determination 403). If the print job originated on the same intranet, the print job is printed (step 406). Otherwise the print job is refused (step 407).

If the security level is set to the next level, or LAN level, the security algorithm will print the job only if the job originated on the LAN to which the printer is itself connected (determination 404). If the print job originated on the same LAN, the print job is printed (step 406). Otherwise the print job is refused (step 407).

Finally, if the security level is set to the highest level, or machine level, the security algorithm will determine whether the machine, computer or server, submitting the print job is identified on a list of authorized printer clients (determination 405). If the print job was submitted by an authorized client, the print job is printed (step 406). Otherwise the print job is refused (step 407).

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A printer having a security algorithm configured to:
   determine a source of an incoming print job; and
   accept or reject said print job based on said source of said print job,
   wherein said security algorithm further accepts or rejects said print job based on a predetermined security level, in which said security level is selectively set at one of the following settings: (1) accept all print jobs, (2) accept print jobs only from within a wide area network or intranet to which said printer belongs, and (3) accept print jobs only from within a local area network to which said printer belongs.

2. The printer of claim 1, wherein said source is determined by whether said printer and a printer client submitting said print job are connected to the same Local Area Network, Wide Area Network, intranet or global network.

3. The printer of claim 1, wherein said predetermined security level is set by a user.

4. The printer of claim 1, wherein said predetermined security level only accepts print jobs from clients on a Local Area Network to which said printer is also connected.

5. The printer of claim 1, wherein said predetermined security level only accepts print jobs from clients on a Wide Area Network to which said printer is also connected.

6. The printer of claim 1, wherein said predetermined security level accepts print jobs from any client.

7. The printer of claim 1, wherein said predetermined security level only accepts print jobs from a particular group of specified clients.

8. A printer having a security algorithm configured to:
   determine a source of an incoming print job;
   accept or reject said print job based on said source of said print job, wherein said security algorithm further accepts or rejects said print job based on a predetermined security level; and
   further comprising an embedded web server and a security web page on which a user can set said security level.

9. The printer of claim 8, wherein said security web page includes an option for a first security level that only accepts print jobs from a particular group of specified clients.

10. The printer of claim 8, wherein said security web page includes an option for a second security level that only accepts print jobs from clients on a Local Area Network to which said printer is also connected.

11. The printer of claim 8, wherein said security web page includes an option for a third security level that only accepts print jobs from clients on a Wide Area Network to which said printer is also connected.

12. The printer of claim 8, wherein said security web page includes an option for a fourth security level that allows print jobs from any client.

13. A security algorithm for a printer stored on a medium for storing machine-readable instructions, said algorithm, when executed, causes a processor of a printer to:
   determine a source of an incoming print job; and
   accept or reject said print job based on said source of said print job;

wherein said source is determined by whether said printer and a printer client submitting said print job are connected to the same Local Area Network, Wide Area Network, intranet or global network.

14. The security algorithm of claim 13, wherein said security algorithm further accepts or rejects said print job based on a predetermined security level.

15. The security algorithm of claim 14, wherein said security algorithm accepts user input to set said predetermined security level.

16. The security algorithm of claim 15, further comprising a security web page on which a user can set said security level.

17. The security algorithm of claim 16, wherein said security web page includes an option for a first security level that only accepts print jobs from a particular group of specified clients.

18. The security algorithm of claim 16, wherein said security web page includes an option for a second security level that only accepts print jobs from clients on a Local Area Network to which said printer is also connected.

19. The security algorithm of claim 16, wherein said security web page includes an option for a third security level that only accepts print jobs from clients on a Wide Area Network to which said printer is also connected.

20. The security algorithm of claim 16, wherein said security web page includes an option for a fourth security level that allows print jobs to be accepted from any client.

21. The security algorithm of claim 14, wherein said predetermined security level only accepts print jobs from clients on a Local Area Network to which said printer is also connected.

22. The security algorithm of claim 14, wherein said predetermined security level only accepts print jobs from clients on a Wide Area Network to which said printer is also connected.

23. The security algorithm of claim 14, wherein said predetermined security level accepts print jobs from any client.

24. The security algorithm of claim 14, wherein said predetermined security level only accepts print jobs from a particular group of specified clients.

25. A method of providing security for a printer comprising:
with said printer, determining a source of an incoming print job;
with said printer, accepting or rejecting said print job based on said source of said print job; and
accepting or rejecting said print job based on a predetermined security level, in which said security level is selectively set at one of the following settings: (1) accept all print jobs, (2) accept print jobs only from within a wide area network or intranet to which said printer belongs, and (3) accept print jobs only from within a local area network to which said printer belongs.

26. The method of claim 25, wherein said source is determined by whether said printer and a printer client submitting said print job are connected to the same Local Area Network, Wide Area Network, intranet or global network.

27. The method of claim 25, further comprising receiving user input to set said predetermined security level.

28. The method of claim 25, further comprising, based on said predetermined security level, only accepting print jobs from clients on a Local Area Network to which said printer is also connected.

29. The method of claim 25, further comprising, based on said predetermined security level, only accepting print jobs from clients on a Wide Area Network to which said printer is also connected.

30. The method of claim 25, further comprising, based on said predetermined security level, accepting print jobs from any client.

31. The method of claim 25, further comprising, setting said predetermined security level by presenting a user with a menu including all of the following options: (1) accept all print jobs, (2) accept print jobs only from within a wide area network or intranet to which said printer belongs, and (3) accept print jobs only from within a local area network to which said printer belongs.

32. A method of providing security for a printer comprising:
with said printer, determining a source of an incoming print job;
with said printer, accepting or rejecting said print job based on said source of said print job;
accepting or rejecting said print job based on a predetermined security level; and
accessing a security web page through a web server embedded in said printer to set said security level.

33. The method of claim 32, further comprising, on said security web page, specifying a first security level that only accepts print jobs from a particular group of specified clients.

34. The method of claim 33, further comprising specifying said group of clients.

35. The method of claim 34, further comprising prompting a user to specify said group of clients.

36. The method of claim 32, further comprising, on said security web page, specifying a second security level that only accepts print jobs from clients on a Local Area Network to which said printer is also connected.

37. The method of claim 32, further comprising, on said security web page, specifying a third security level that only accepts print jobs from clients on a Wide Area Network to which said printer is also connected.

38. The method of claim 32, further comprising, on said security web page, specifying a fourth security level that accepts print jobs from any client.

39. A printer comprising:
means for determining a source of an incoming print job; and
means for accepting or rejecting said print job based on said source of said print job;
wherein said source is determined by whether said printer and a printer client submitting said print job are connected to the same Local Area Network, Wide Area Network, intranet or global network.

40. The printer of claim 39, wherein said means for accepting or rejecting said print job also operate on a predetermined security level that specifies from which sources a print job will be accepted.

41. The printer of claim 40, wherein said predetermined security level is set by a user.

42. The printer of claim 41, further comprising an embedded web server and a security web page on which a user can set said security level.

43. The printer of claim 40, wherein said predetermined security level only accepts print jobs from clients on a Local Area Network to which said printer is also connected.

44. The printer of claim 40, wherein said predetermined security level only accepts print jobs from clients on a Wide Area Network to which said printer is also connected.

45. The printer of claim 40, wherein said predetermined security level accepts print jobs from any client.

46. The printer of claim 40, wherein said predetermined security level only accepts print jobs from a particular group of specified clients.

* * * * *